United States Patent [19]
Balogh et al.

[11] 4,452,548
[45] Jun. 5, 1984

[54] POND WITH FILTERED WATER

[75] Inventors: Ákos Balogh; László Széher, both of Esztergom, Hungary

[73] Assignee: Komarom Megyei Tanacsi Tervezo Iroda, Esztergom, Hungary

[21] Appl. No.: 328,541

[22] PCT Filed: Apr. 2, 1981

[86] PCT No.: PCT/HU81/00013
 § 371 Date: Dec. 2, 1981
 § 102(e) Date: Dec. 2, 1981

[87] PCT Pub. No.: WO81/02905
 PCT Pub. Date: Oct. 15, 1981

[30] Foreign Application Priority Data
 Apr. 2, 1980 [HU] Hungary ................................ 780/80

[51] Int. Cl.³ .............................................. E02B 7/00
[52] U.S. Cl. ...................................... 405/52; 405/36; 405/128; 210/170
[58] Field of Search ................... 405/36, 52; 210/170; 405/37–45, 128, 129, 53, 118, 119

[56] References Cited

U.S. PATENT DOCUMENTS

| | | | |
|---|---|---|---|
| 779,703 | 1/1905 | Gardner | 210/170 |
| 802,183 | 10/1905 | Durbrow | 210/170 |
| 1,995,367 | 3/1935 | Stewart | 210/170 |
| 2,038,316 | 4/1936 | Rosenstein | 405/36 |
| 3,422,010 | 1/1969 | Case | 210/170 |
| 3,854,291 | 12/1974 | Perkins | 210/170 |
| 4,343,696 | 8/1982 | Hung | 210/170 |

FOREIGN PATENT DOCUMENTS

| | | | |
|---|---|---|---|
| 2613826 | 10/1977 | Fed. Rep. of Germany | 405/36 |
| 651085 | 3/1979 | U.S.S.R. | 405/36 |

Primary Examiner—Dennis L. Taylor
Attorney, Agent, or Firm—Young & Thompson

[57] ABSTRACT

The invention relates to a pond (2) with filtered water having a relatively large and free surface. The pond (2) is laid out along a polluted surface water (1) having a large rate of flow or quantity of water, and a filter dam (3) is built between the polluted surface water (1) and the pond (2) of filtered water. The pond (2) according to the invention can be employed as a water intake for drinking water and/or for water for agriculture and/or for industrial water, and as a recreational area (4,5).

7 Claims, 3 Drawing Figures

POND WITH FILTERED WATER

THE TECHNICAL FIELD

The invention relates to a pond with filtered water having a relatively large and free surface, i.e., a small artificial lake whose bed is filled with treated and clarified water which is prevented from being polluted.

STATE OF THE ART

The pollution of surface waters, such as rivers, ponds, lakes or seas has assumed terrifying proportions. Nowadays, many surface waters are unfit not only for drinking and bathing, but also for industrial purposes. These waters should more and more be referred to as "dead water", in which life in the biological sense is impossible.

Tackling the problems of supplying industries, agricultural establishments, and communities with adequately clarified water which is pure from the hygienic and sanitary points of view becomes more and more urgent. Various proposals have been advanced to solve these problems:

When the surface waters are unit for *bathing*, beaches are constructed with basins which perform the function and meet the requirements of the recreational area. This concept is followed in the terrain regulation of the power stage system in Gabcikovo-Nagymaros on the Donau. However, these beaches have a very limited capacity. The construction, operating and maintenance costs are extremely high and they can be used to perform one function only.

The aquosity of a water-producing region can be increased by means of *ground water basins*, whose water is clarified preliminarily. This was copied in various publications. We refer to the Hungarian journal Hidrológiai Közlöny (Hidrological Communications) No. 7/1976 (an article by Károly Gefferth) and 1/1975 (an article by Drs. Takács and Andrik). In these articles, the methods are hydrobiological and bacteriological effects of the enrichment of the ground water are explained. However, also the ground water basins can perform only one function; with the preliminarily clarified water only the quantity of water of the water-producing facility can be increased.

In regions with good ground water aquifers, the small quantity of water that can be obtained is increased through supply with preliminarily clarified water. This solution has been copied by Mária Bauer after a Dutch example (Hidrológiai Közlony, No. 8/1973). It is very uneconomical, the production and operating costs are high and the water thus obtained is unfit for human consumption.

The water of the *high tides* in spring is less polluted. Thus, it is stored in safety reservoirs and consumed at low tides. This concept is employed in Hungary in the water regime between Tatabánya and Székesfehérvár. However, these safety reservoirs have widely varying levels and can be used for one purpose only. They are unfit for use in a recreational area.

Thus, most prior art solutions require the water to be treated preliminarily, because the pretreated water is stored and finally consumed. Many proposals are known for treating water.

Published West German Pat. DT No. 1 918 682 describes a filter system in which a plurality of parallel filter zones filled with a filter material are provided and a channel is constructed between the filter zones which is surrounded on all sides by a porous membrane.

Published West German Patent Application DT No. 2 400 497 describes a method for the biological improvement of river, pond, and lake water, in which a portion of the water is taken from the polluted pond and fed to an aerated reservoir containing a filling material, such that the water trickling through the reservoir is enriched up to the saturation point and is then allowed to flow back into the pond. This method can only be employed if the pond is slightly polluted.

The other prior art solutions: (West German Pat. No. 2 610 334: Method for the mechanical and chemical treatment of liquid media loaded with solids and ionic pollutants in a filter bed consisting of granular material; West German Pat. No. 2 636 094: Method for the regeneration of water, i.e., to raise the energy level in water and, thereby, its biological value; West German Pat. No. 2 530 722: Method for the nitrification, demanganization and deferrization in fixed beds and biological fixed-bed reactors) can only be implemented in laboratories, but only with small quantities of water. In no way can they be applied to clarify a quantity of water needed for a pond with filtered water.

Summing up, it can be said that the prior art techniques still have not solved the problems of water treatment by a long shot. In general, the proposed solutions have only one function. They solve only one problem, are highly uneconomical, and a great deal of money is required to construct them.

PRESENTATION OF THE INVENTION

The primary object of the invention is to solve the problems of water pollution in large surface waters and at the same time to overcome the inadequacies of prior solutions.

In order to solve the above problems, we have developed the idea of storing the clarified water in a pond, to treat the large quantity of water required not with special filter systems, but with a suitably constructed filter dam, and finally to lay out the pond thus built and filled with filter water next to the polluted surface water.

Therefore, the present invention relates to a pond having a relatively large and free surface. The development of this idea, i.e., the invention itself, is seen in the fact that the pond is laid out with a large quantity of water along a polluted surface water and to build up a filter dam between the polluted surface water and the pond with filtered water.

In this way, the pond embodying the teachings of the invention has a triple function: production and storing of water as well as recreation. Furthermore, the construction of the pond is very simple and inexpensive and the operating costs are low. The construction of the pond can be combined with other water management tasks, water assessments, elimination of water damage, etc., as well as with the output from mineral stock. All in all, it can be stated that the pond with filtered water as proposed by this invention is cost effective.

The filter dam in accordance with the invention can be constructed in such a way that it can be mechanically, chemically, biologically and bacteriologically filtered by it. The filter dam can be constructed as a natural or artificial filter dam. In the first instance, the ground that has grown on the spot has adequate filtering characteristics which can be exploited during the construction. In the latter case, the corresponding filtering characteristics of the filter dam must be adjusted with banked earth transported thereto that has good filtering properties or with artificial materials. It goes without saying that both solutions can be combined.

The term "filter dam" in this context can be interpreted in many different ways. As an example, when the grown soil has filtering characteristics which are adequate for the given task, an impermeable dam can be built as filter dam. The polluted water will inevitably flow through the soil with good filtering characteristics and will be adequately treated. Such a filter can, for instance, be employed in a bay of a surface water in which the bay is separated from the polluted body of water by an impermeable dam constructed on the soil with good filtering properties. The polluted water is then lifted off the bay and the water flowing thereinto is treated through the grown soil.

According to the invention, the pond with filtered water can also serve as a water base. The water can be obtained from the subterranean stock of water through shore filtering wells and board wells or from the stock of water above ground by means of surface adits, drain weirs, or booster pumps. In this way, the pond can also be a safety water base which stores the filtered water during peak pollution periods and pollution disasters. "Twice-filtered" water can be obtained from the subterranean stock of water.

The surroundings of the pond may be subjected to the demands on water purity in conformity with the terrain control. Thus, the polluted water or the waste waters of the surroundings are prevented from getting to the pond.

This terrain control means that the small water courses of the water catchment grounds are guided into colloid-filtering or biological clarification ponds and are treated therein. The clarification ponds are connected with the pond with filtered water. The waste waters of the surroundings of the pond can be guided in closed waste water channels and, after appropriate treatment, conducted into the pond. In extreme cases, when these waters are very polluted, they can be introduced into the surface water through reversing water courses or reversing sewer ducts.

The third function of the pond embodying the teachings of the invention can also be performed through the terrain control: recreational areas can be constructed on its banks. To make the pond also agreeable for bathing, a bed floor may be grown and/or built thereon.

Further details of the invention will be apparent to those skilled in the art from the following description of one specific embodiment thereof as illustrated in the attached drawings.

THE BEST PRACTICAL EMBODIMENT OF THE CLAIMED INVENTION

Figure 1:
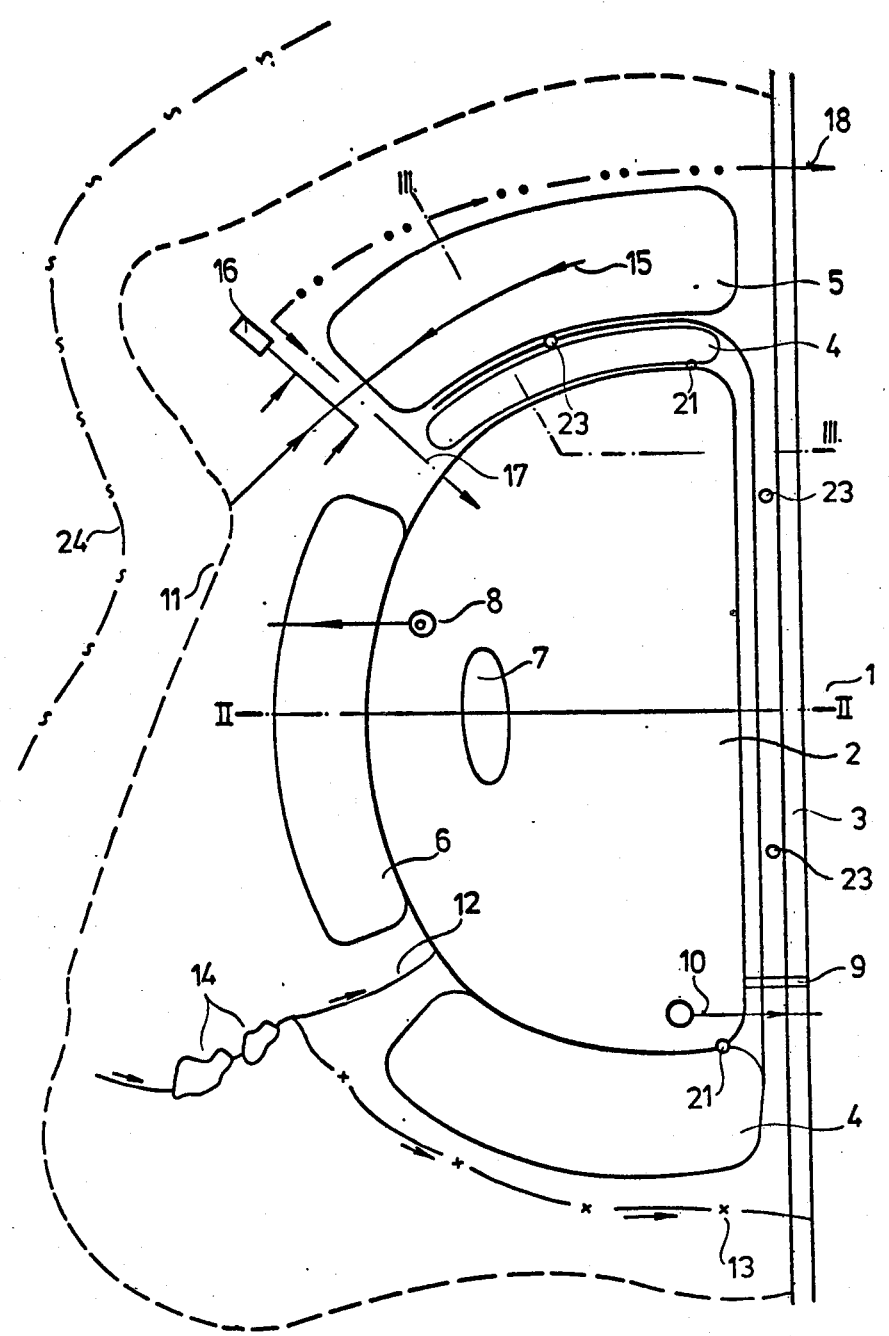
FIG. 1 is a site plan, a top view of a practical embodiment of the pond embodying the invention.

FIG. 1 shows the site plan of a practical embodiment of the pond 2 embodying the teachings of the invention and filled with filtered water; it has actually been built.

The pond 2 with filtered water has a relatively large and free surface. Hence, it is distinguished from this type of prior art water reservoirs in which the water is filtered through the bottom and which have a relatively small surface or no free surface at all, such as wells.

The pond 2 is constructed along a surface water 1 which, if it is a river, has a large rate of flow or, if it is stagnant water or swamp water, has a large quantity of water and whose water has become more or less polluted. Between the pond 2 and the surface water 1 a filter dam 3 has been built which separates the polluted water of the surface water 1 from the treated water of the pond 2. In this embodiment, recreational areas have also been built around the pond 2, an undeveloped recreational area is denoted by the reference numeral 4 and a developed recreational area by the numeral 5.

In this embodiment, the pond 2 is provided with water intakes. On the banks of the pond, shore filter wells are arranged in various rows, the ground area they occupy is denoted by 6. Board well 7 has been sunk in the pond 2. Twice-filtered water can be drawn off the shore filter wells 6 and the board wells 7 because here, too, the water is filtered for the second time through the bottom of the bank or of the bed of the pond 2. A water catchment 8 on the surface of the pond 2 and a drain weir 9, as well as a booster pump 10, serve as water intakes for the stock of water above ground. The drain weir 9 can also function as a high-tide conduit. The booster pump 10 may be provided with a fairly long suction pipe, with the result that the more heavily polluted water encountered in the vicinity of the bottom of the pond 2 can be lifted to the surface water 1.

An orographic water-catchment terrain with its border (broken line) is indicated by the reference numeral 11. Small water courses 12 rise from here and from a geological water catchment terrain 24. The water of these small water courses 12 is conducted into the colloid-filtering and biological clarification pond 14 and thereafter into the pond 2 or thru a reversing water course 13 into the surface water 1.

The waste water of the recreational areas 4 and 5 is collected in the closed sewer duct 15 and guided either to a sewage plant 16 or to the surface water 1 through a reversing sewer duct 18. The sewage plant 16 is connected with the pond 2 by means of a collector 17.

Various functions can be performed by means of the pond 2 embodying the principles of the invention. Drinking water can be obtained from the shore filter wells 6 and from the board wells 7. With the water catchment 8 or with the drain weir 9 or the booster pump 10, water can be obtained for direct irrigation or as compensation water and, after preliminary treatment, as industrial water.

Figure 2:
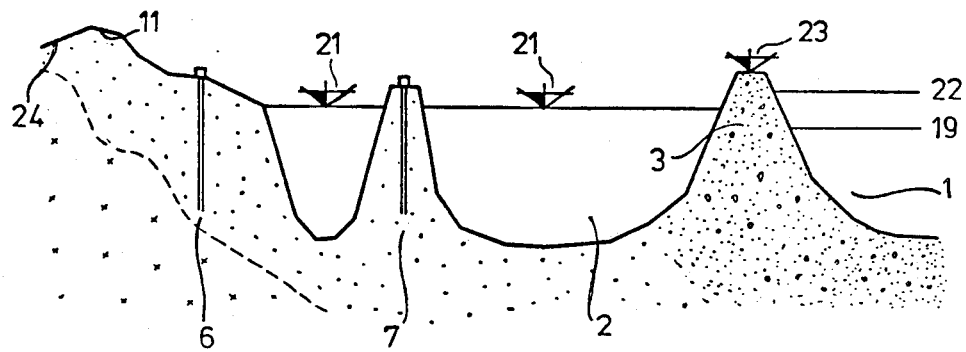
FIG. 2 is a cross-sectional view taken along the line II—II of FIG. 1.

FIG. 2 is a cross-sectional view of the pond 2 of FIG. 1 showing the arrangement of the shore filter wells 6 and of the board wells 7. An operating water surface of the pond 2 is denoted by 21, the height of the filter dam 3 by 23, a minimum water level by 19, and a maximum water level of the surface water 1 by 22.

Figure 3:
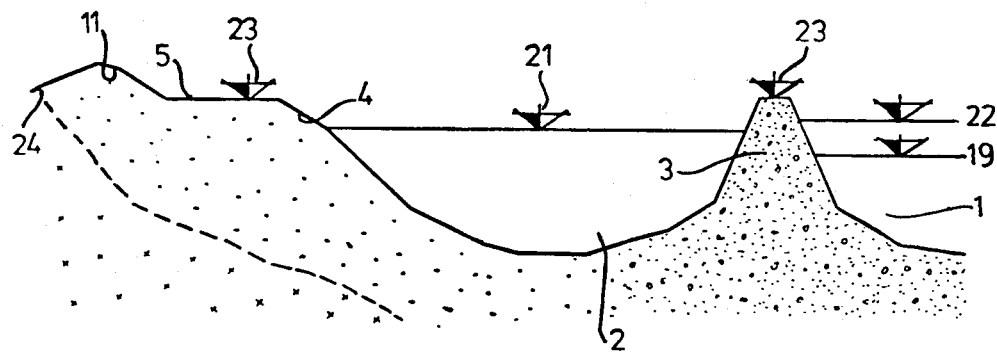
FIG. 3 is a cross-sectional view taken along the line III—III of FIG. 1.

FIG. 3 is another cross-sectional view taken along the line III—III of FIG. 1 showing the terrain control of the surroundings of the pond 2.

Due to the quantity of superfluous water, the stock of water of the pond, which is continually and dynamically renewed, has positive water budget. This water budget of the pond 2 can be controlled by means of the water intakes. In this way, the quantity of water trickling through the filter dam 3 can be simultaneously controlled.

The filter dam 3 is dimensioned in accordance with the surface variation occurring between the minimum water 19 and the maximum water 22 of the surface water 11 for a specified filtration/seepage boundary. This dimensioning determines the quality of the water of pond 2. The water filtered through the filter dam 3, whose quality is predetermined in this manner, also eliminates the pollution effect of the precipitation and of the use of the pond. Thus, the filter dam 3 is constructed in accordance with these requirements and is made from natural and/or artificial materials, as mentioned earlier.

The filter dam 3 is operated as a filter membrane. Its surface, but also the deeper layers, can be heavily polluted, even clogged. Therefore, the filter dam must be cleaned periodically, it must be maintained. This can be done in two ways:

through flushing, in which owing to the very low minimum water level 19 of the surface water level 1 a reversed current occurs. The seepage in the direction opposite to the normal direction carries into the surface water 1 the pollutants that have been deposited on the surface of the filter dam 3;

through mechanical treatment, in which the surface of the filter dam 3 is scraped off, worn off, or ripped, or at least eroded in part, and occasionally fully modified.

Finally, it should be mentioned that in addition to the functions discussed earlier, the pond 2 embodying the teachings of the invention can also be exploited for continuously improving the quality of a surface water 1. The polluted water of the surface water 1 is continuously cleaned through the filter dam 3 and the filtered water is returned from the pond 2 to the surface water 1. When a number of such ponds 2 are constructed along a polluted river, with which the polluted water is continually clarified, the quality of the water of the surface water can be substantially improved.

The practical usefulness of the invention for industry is apparent from the remarks outlined above. Moreover, the invention is of great significance not only for industry and agriculture, but it also contributes to combatting the human problems created by environmental pollution.

We claim:

1. A pond with filtered water having a relatively large and free surface, characterized in that the pond (2) is laid out along a polluted surface water (1) having a large rate of flow or quantity of water and that a filter dam (3) is built between the polluted body of water (1) and the pond (2) with filtered water, the material of the dam being permeable to water, and means to withdraw water from the pond so as to lower the water level in the pond below the water level of said polluted surface water thereby to cause the latter water to flow through the material of the dam and into the pond.

2. A pond according to claim 1, characterized in that the polluted water of the surface water (1) is filtered mechanically, chemically, biologically and bacteriologically through a filter dam (3).

3. A pond according to claim 1 or 2, characterized in that the filter dam (3) is built as a natural fiber dam from the locally grown soil with good filtering properties.

4. A pond according to claim 1 or 2, characterized in that the filter dam (3) is built as an artificial filter dam from banked earth and/or artificial materials.

5. A pond according to claim 1, characterized in that the pond (2) is provided with water intakes.

6. A pond according to claim 1, characterized in that a booster pump (10) is constructed as a unit that brings polluted water encountered in the vicinity of the bottom of the pond (2) to the surface water (1).

7. A pond according to claim 2, characterized in that recreational areas (4, 5) are built on its bank.

* * * * *